E. WIARD.
HANDLE SEAT FOR PLOWS.

No. 102,071. Patented Apr. 19, 1870.

UNITED STATES PATENT OFFICE.

EDWARD WIARD, OF LOUISVILLE, KENTUCKY, ASSIGNOR TO B. F. AVERY.

IMPROVEMENT IN HANDLE-SEATS FOR PLOWS.

Specification forming part of Letters Patent No. 102,071, dated April 19, 1870.

*To all whom it may concern:*

Be it known that I, EDWARD WIARD, of Louisville, in the county of Jefferson and State of Kentucky, have invented a new and useful Improvement in Handle-Seats for Plows; and I do hereby declare that the following is a full, clear, and exact description thereof, which will enable others skilled in the art to make and use the same, reference being had to the accompanying drawings, forming part of this specification, in which—

Figure 1:
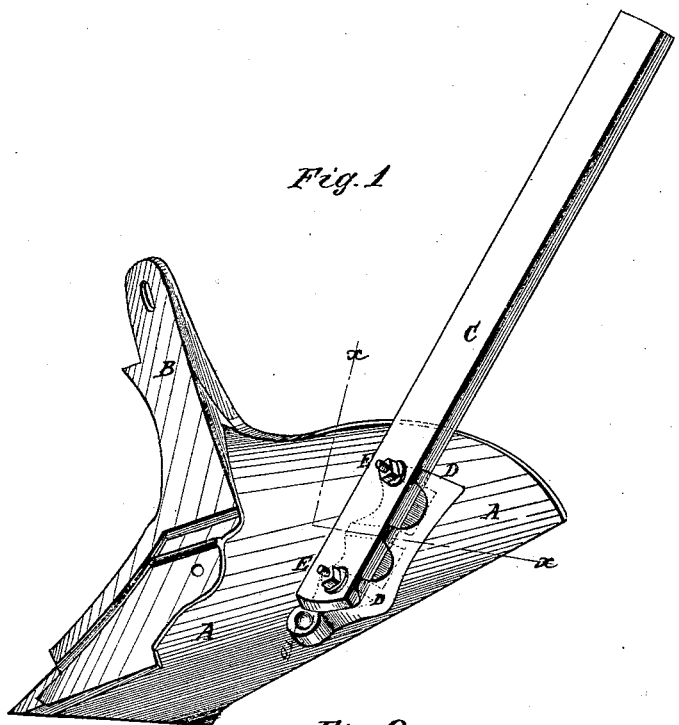
Figure 2:
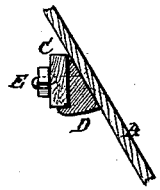

Figure 1 represents a plow-handle attached to the mold-board of a plow by means of my improved handle-seat. Fig. 2 is a detail sectional view of the same, taken through the line $x$ $x$, Fig. 1.

Similar letters of reference indicate corresponding parts.

My invention has for its object to furnish an improved seat for securing the handle to the mold-board of plows, which shall be so constructed as to hold the handle firmly and securely; and it consists in the seat, constructed as hereinafter more fully described, in combination with the mold-board and handle of the plow.

A represents the mold-board, and B the standard of the plow, about the construction of which parts there is nothing new. C is the mold-board handle, which is secured in place and supported by means of the seat D. D is the seat, the face of which is so formed as to fit closely upon the inner surface of the mold-board A. The seat D is formed with an outwardly-projecting flange upon its rear edge, against which the rear edge of the handle C rests, and which may be notched, as shown in Fig. 1. The seat D is also formed with two or more low cross-flanges, upon which the inner side of the handle C rests. The handle C is secured to the seat D, and the said handle and seat are secured to the mold-board A by two bolts, E, passing through the said mold-board, seat, and handle, as shown in Figs. 1 and 2, the heads of said bolts being countersunk into the face of the mold-board A in the ordinary manner. The lower end of the seat D projects below the lower end of the handle C, and in the said projecting end is formed a socket, $a$, to receive the mold-board end of the cross-brace or stretcher that supports the mold-board against inward pressure. The seat D holds the handle C firmly and securely, and enables a straight handle to be used, thus diminishing the cost of construction and the cost of repairing the plows.

In the case of steel plows the seat D is made separate from the mold-board A, and is secured to the said mold-board in the manner hereinbefore described.

Having thus described my invention, I claim as new and desire to secure by Letters Patent—

A plow provided with the seat D, having one face fitted closely upon the inner surface of mold-board A, having an outwardly-projecting notched flange upon its rear edge to support the corresponding portion of handle C, two cross-flanges to support the inner side of handle C, and a socket, $a$, to receive the mold-board end of the cross-brace, all as and for the purpose specified.

EDWARD WIARD.

Witnesses:
H. L. HEWITT,
JNO. H. MCMULLIN.